May 31, 1927.

H. H. FISHER ET AL 1,630,839

PROCESS OF LINING WATERCOURSES AND LINING THEREFOR

Filed July 17, 1922   8 Sheets-Sheet 1

Witness
Martin H. Olsen

Inventors
Harry H. Fisher and
Walter B. Rittenhouse
By Jno. E. Walker
Atty.

May 31, 1927. 1,630,839
H. H. FISHER ET AL
PROCESS OF LINING WATERCOURSES AND LINING THEREFOR
Filed July 17, 1922　　8 Sheets-Sheet 2

Patented May 31, 1927.

1,630,839

UNITED STATES PATENT OFFICE.

HARRY H. FISHER AND WALTER B. RITTENHOUSE, OF CHICAGO, ILLINOIS, ASSIGNORS TO BYLLESBY ENGINEERING AND MANAGEMENT CORPORATION, OF WILMINGTON, DELAWARE, A CORPORATION OF DELAWARE.

PROCESS OF LINING WATERCOURSES AND LINING THEREFOR.

Application filed July 17, 1922. Serial No. 575,467.

This invention relates to a process of and apparatus for lining water-courses.

As is generally well known, where water is conducted from a source of supply to a point of use or distribution in unlined water-courses formed in earth, there is a large percentage of loss due to seepage, varying with the character and porosity of the earth in which the water-course is formed, the length of said water-course and the rate of flow. In many cases this loss is so great, that where the supply of water is limited—as in many arid parts of the West where agriculture is almost entirely dependent on irrigation—State authorities having charge of such matters have required that ditches for irrigation and other purposes should be lined with material impermeable to water, concrete, gunite, or other cement mixtures being principally used for this purpose. To line water-courses during initial construction is, of course, a comparatively simple matter, involving in most cases, merely the item of additional expense, and presents no construction problems of a serious nature excepting, possibly, the transportation of the material to be used in lining said water-courses. Nor, speaking generally, would any serious problem be presented in cases where it is possible to divert or shut off the supply of water to the water-course and permit the same to run dry.

In many cases, however, it is entirely impractical to permit a water-course to run dry, thus shutting off water to the district or area served thereby and, under such circumstances it becomes necessary either to divert or by-pass the water from successive sections of a water-course while it it being lined, which, from the topography of the country through which the water-course runs, may be impractical or even impossible and, in any event will involve large expense; or, as an alternative to line the water-course while it contains water, diverting or shunting off the water from comparatively short sections of the water-course for short periods of time only, or possibly not at all.

After careful study of the problems presented and after careful experiment and actual demonstration we have concluded that the solution of the proposition which is most feasible, consists in lining water-courses already constructed and in use, while they contain water.

Our invention, therefore, has particular reference to a process of and apparatus for lining water-courses while they contain water, and the object of the invention is to provide an improved process of and apparatus for this purpose.

To effect the object of the invention, our improved process of lining water-courses comprises the various steps and the apparatus which we have devised for carrying out said process, comprises the various features, combinations of features and details of construction hereinafter described and claimed.

In the accompanying drawings, in which our invention is fully illustrated,

Figures 12 and 13 are plan views thereof taken from the top and bottom sides, respectively, of Fig. 11, Figure 12 being on an enlarged scale.

Figure 24 is a detail sectional view on the line 24—24 of Fig. 12.

In accordance with our improved process of lining water-courses, we first construct the lining in the form of separate trough-shaped sections, said lining sections being preferably made of a suitable cement mixture, which may be reinforced by rods, wires, or other metallic reinforcing members embedded therein, in a familiar manner, said lining sections being constructed on suitable mold forms which also provide means for lifting, handling, and protecting said lining sections, which are detachably secured thereto, preferably in the course of construction.

A lining section, designated as a whole A, adapted for the practice of our improved process is shown in Figs. 7 to 10 of the drawings, said lining section being reinforced and strengthened by wires 1 and 2 embedded therein, which extend lengthwise and transversely thereof, respectively.

Figures 7, 8, 9, 10:
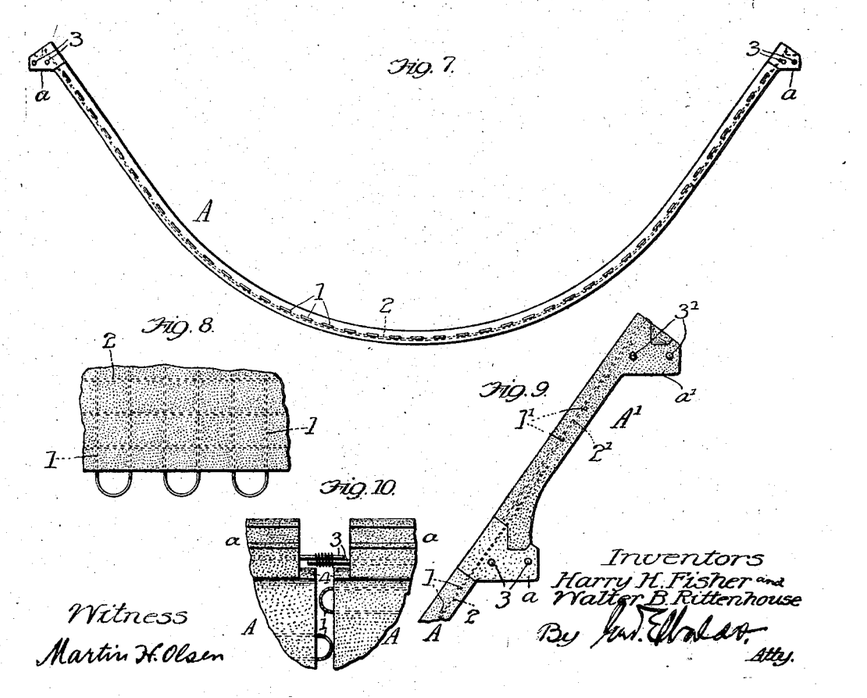
Figure 7 is a detached end view of a lining section adapted for lining water-courses in accordance with our invention.
Figures 8, 9 and 10 are enlarged fragmentary views illustrating certain details of construction.
Figures 11, 22, 23:
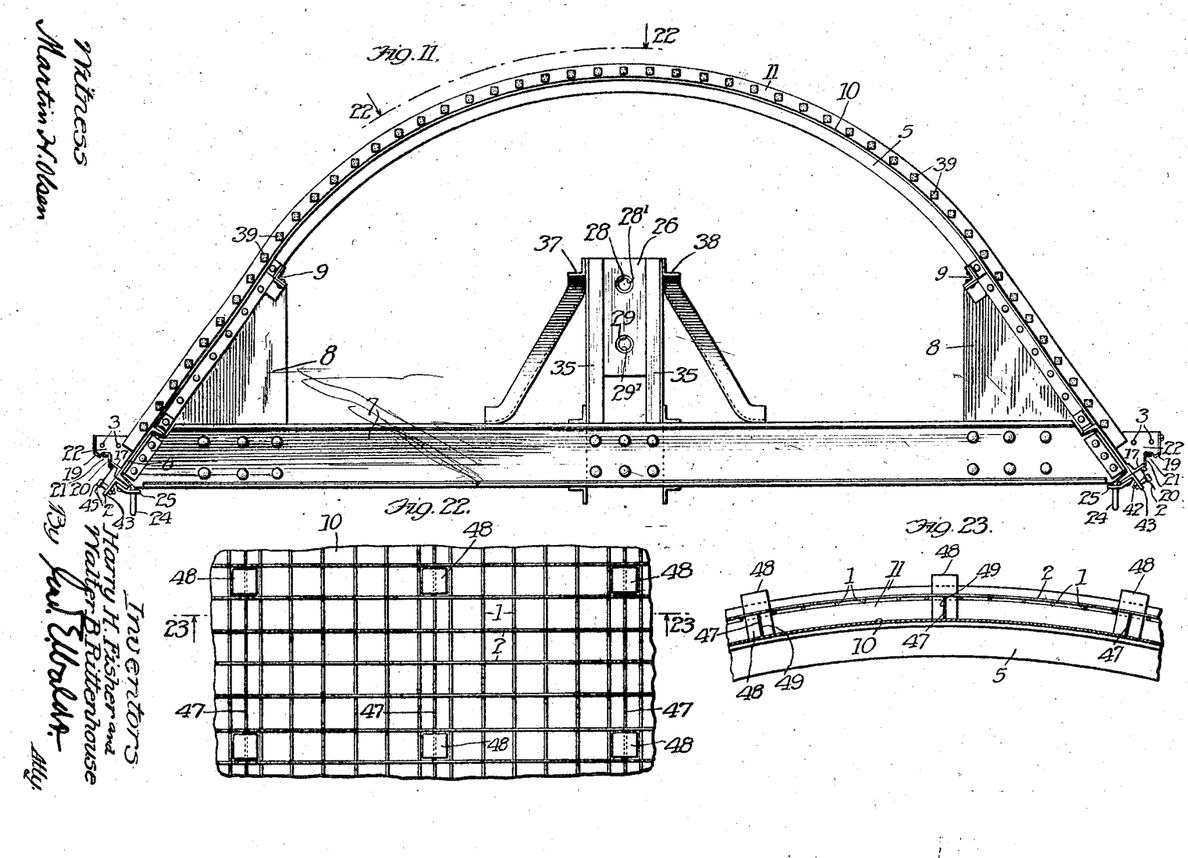
Figure 11 is an end view of a mold form adapted for making lining section to be used in lining water-courses in accordance with our improved process.
Figure 22 is an enlarged fragmentary plan view from the position 22—22 of Fig. 11.
Figure 23 is a sectional view on the line 23—23 of Fig. 22.
Figures 12, 24:
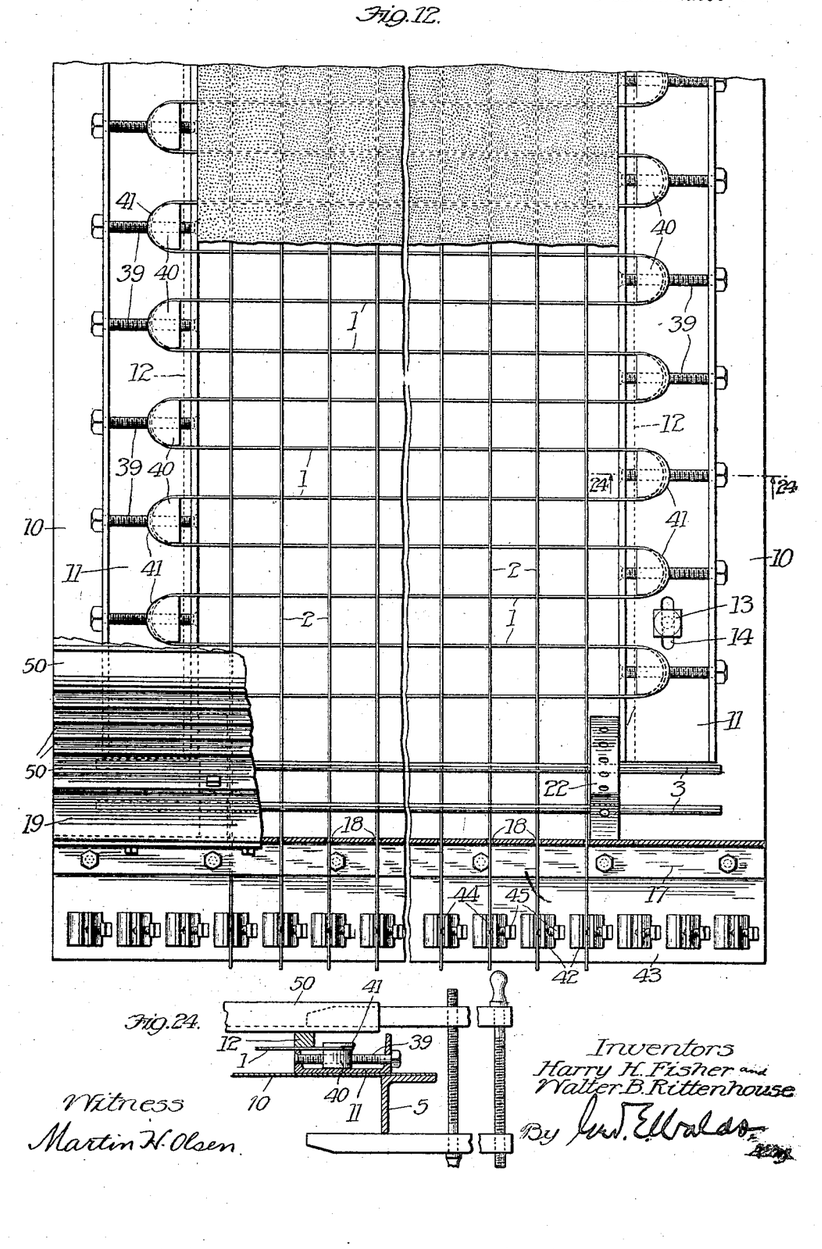
Figure 14:
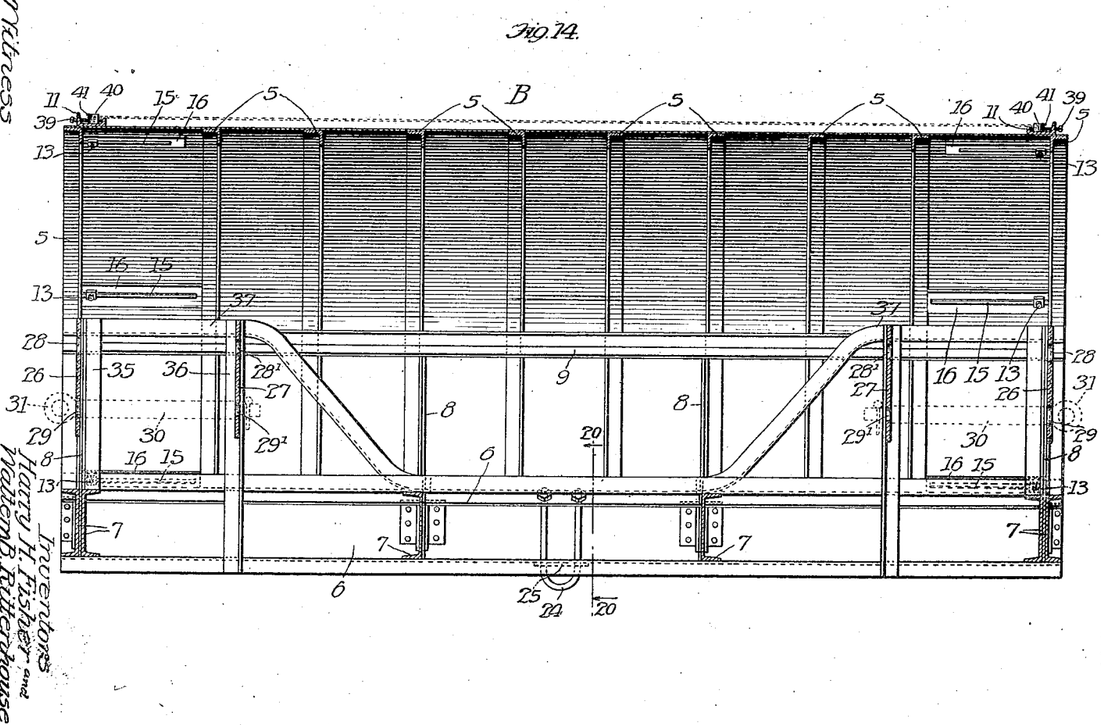
Figure 14 is a sectional elevation on the line 14—14 of Fig. 13.
Figure 15:
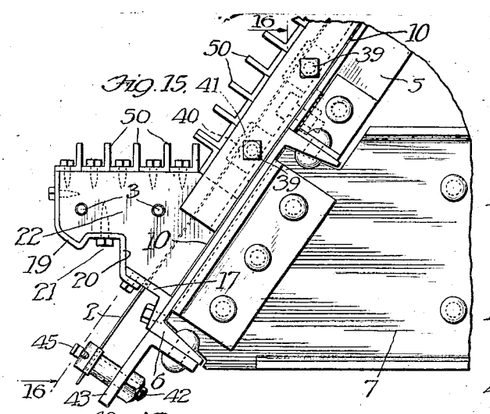
Figure 15 is an enlarged view of a portion of the end of the mold.
Figures 16, 18:
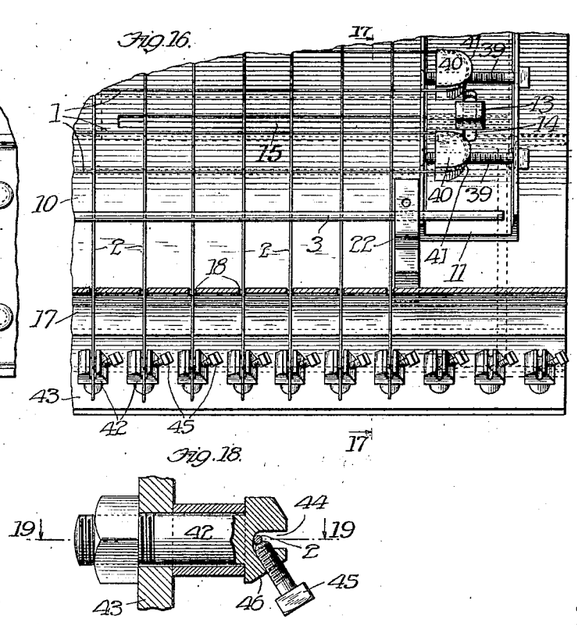
Figure 16 is a sectional plan view taken substantially on the line 16—16 of Fig. 15.
Figure 18 is an enlarged fragmentary sectional view on the line 18—18 of Fig. 17.
Figure 17:
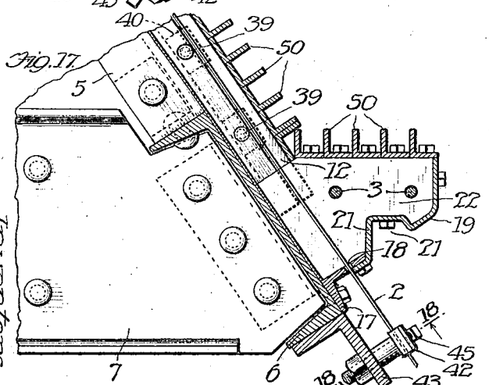
Figure 17 is a sectional view on the line 17—17 of Fig. 16.
Figure 19:
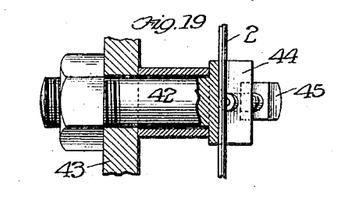
Figure 19 is a sectional view on the line 19—19 of Fig. 18.
Figure 20:
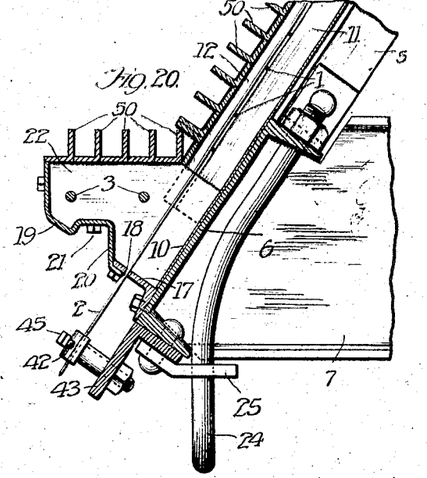
Figure 20 is an enlarged fragmentary sectional view on the line 20—20 of Fig. 14.
Figure 21:
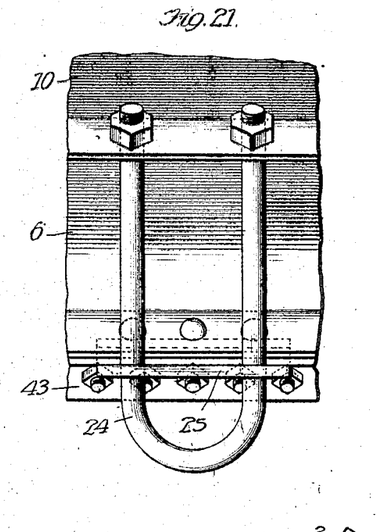
Figure 21 is a view from the right hand side of Fig. 20.
Figure 23:
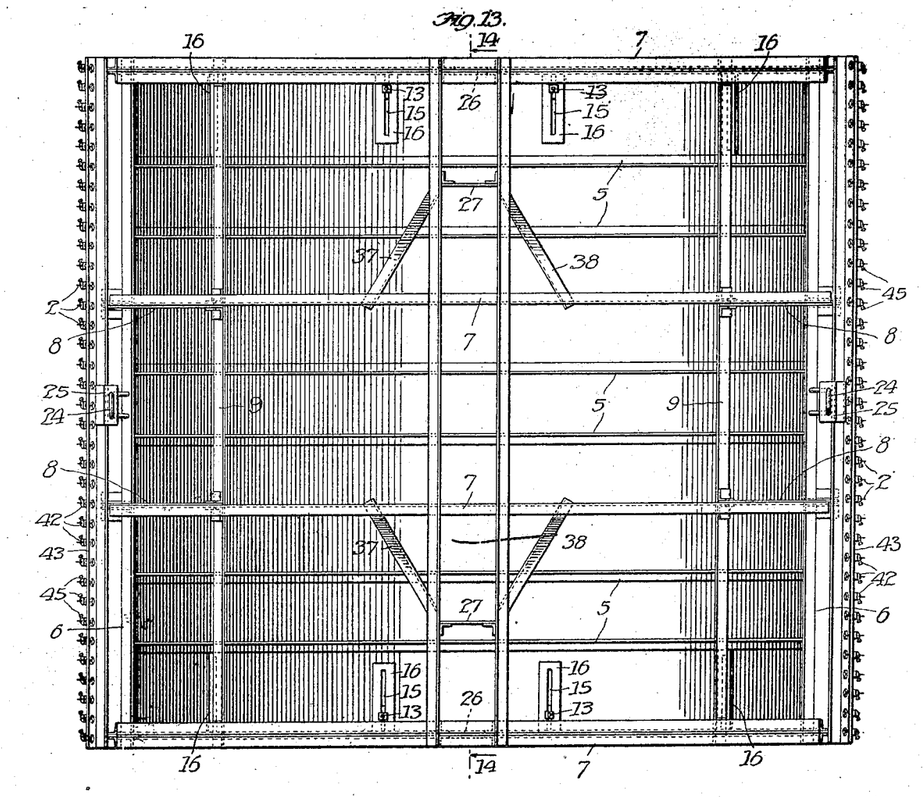

The lining sections A are trough-shaped in cross section, the sides thereof preferably flaring upwardly and outwardly, and are made sufficiently thick to insure requisite strength, a desirable thickness for usual purposes being approximately two (2) inches. While, as shown, the bottoms of the trough-shape sections are curved, the shape thereof is immaterial and may be modified as desired.

For reasons presently explained, the lining sections A are provided at their lateral edges with enlargements or copings $a$ which, in addition to the transverse reinforcing members 2 are reinforced by relatively large rods 3 which extend lengthwise and project at both ends of said coping sections $a$, the relation being such that the rods 3 of adjacent lining sections will overlap.

In practice, we contemplate the use of reinforcing rods 3 approximately three-eighths (⅜ths) of an inch in diameter, the projecting overlapping ends of the rods of adjacent lining sections being clamped or otherwise rigidly secured together. Owing to the size of said rods, they will be quite stiff and to provide for springing them into contact, in case they happen to be out of alignment, recessed shoulders 4, Fig. 10, are preferably formed at the ends of the copings $a$ of the lining sections A, forming relatively long spaces into which the projecting ends of said reinforcing rods 3 will extend.

For purposes of clear and definite illustration, we have, in the drawings, shown a process of and apparatus for lining water-courses with concrete.

The practice of our improved process involves the use of apparatus for fabricating the lining sections A, and in the drawings we have shown a mold-form suitable for this purpose.

We do not, however, desire to limit ourselves to a process of lining water-courses with concrete, as, in view of our disclosure, the adaptation of our improved process for lining water-courses with other cement mixture, particularly gunite, will be obvious to persons skilled in different types of concrete construction.

Neither, in the practice of our improved process, do we desire to limit ourselves to the use of any particular form of apparatus, the mold-form shown being merely illustrative and admitting of a wide range of variation within the scope of our invention.

For use in the practice of our improved process it is essential, however, that the mold-forms shall be provided with passageways through which the water contained in the water-course may flow.

Referring now to the drawings, the mold-form, designated as a whole B, will now be described with particular reference to casting said lining sections from concrete:— Said mold-form B comprises a suitable frame consisting of angle bars 5 bent to conform to the shape, in cross section, of the inner surface of the lining sections A, the ends of said angle bars being rigidly connected to channel bars 6 which extend lengthwise of said mold-form and which, in turn, are connected to transverse channel bars 7 comprising channel bars at the ends of said mold-forms the webs of which are rigidly connected to each other, and any desired number, as shown two, intermediate channel bars. Also, to impart desired strength and rigidity to said mold-form, the angle bars 5, the longitudinal channel bars 6 and the transverse channel bars 7, are all rigidly connected by gusset plates 8 riveted thereto in a usual manner. The channel bars 7 are rigidly connected to each other by longitudinal angle bars 9.

Secured to the outer sides of the angle bars 5 is a skin-plate 10 of suitable material, preferably sheet metal. Said skin-plate forms the inner wall of the mold cavity, and in usual practice will be about three-sixteenths (³⁄₁₆ths) of an inch thick.

As herein shown and described, the framework of the mold-form B within the skin-plate 10, is of skeleton construction which will provide a passageway through which water contained in the water-course may flow, when said mold-form is deposited in contemplate position therein in the practice of our improved process, in the manner described.

The ends of the mold are formed in part by the inner flanges of channel bars 11 secured to the outer surface of the skin-plate 10 at or adjacent to its opposite ends and in part by bars 12 supported outside of the inner flanges of said channel bars 11, in the manner presently described.

In straight work, the ends of the lining sections A will be substantially parallel with each other, while on curves the ends of said lining sections will preferably extend on lines disposed at angles to each other defined by radii of the curves described by the water-course and to provide for constructing said lining sections with their ends parallel or extending at desired angles to each other, the channel bars 11 are preferably secured to the skin-plate 10 so as to be angularly adjustable thereon. As shown, said channel bars 11 are detachably connected to the skin-plate 10 by means of bolts 13, which extend through elongated holes 14 and slots 15 formed, respectively, in the webs of the channel bars 11 and in opposite ends of the skin-plate 10, the holes 14 being made sufficiently long to provide for desired angular adjustment of said channel bars. In the preferable construction shown, also, the skin-plate 10 is reinforced by plates 16 spot-welded or otherwise rigidly secured thereto at the points where the slots 15 are formed, said slots extending through both the skin-plate 10 and said reinforcing plates 16.

At the lateral edges of the mold-form, the mold cavity is closed in part by angle bars 17, which extend lengthwise of said mold-form, a flange of each of which is spot-welded or otherwise secured to the webs of the channel bars 6. Slots 18 adapted to receive the transverse reinforcing wires 2 are formed in the edges of the flanges of the angle bars 17 which project outwardly from the webs of the channel bars 6.

The sections of the mold cavity for the copings *a* are formed by sheet metal sections 19 detachably secured to the outwardly projecting flanges of the angle bars 17, said sheet metal sections being preferably secured to the inner faces of said flanges above or outside of the transverse reinforcing wires 2. Said sheet metal sections preferably comprise portions 20, shaped to form longitudinal grooves or channels 21 in the edges of the copings *a*, the outer side of which preferably extends substantially parallel with the surface of the skin-plate 10, adjacent to its lateral edges. The purpose of said channels 21 will be presently explained.

The ends of the portions of the mold cavity defined by the sheet metal mold sections 19 are closed by blocks 22, shaped to conform to the desired shape in cross section of the copings *a*. Said end blocks may be secured in position by means of lag screws inserted through holes in the sheet metal mold sections 19 into said end blocks.

To provide for conveniently handling the mold-forms B, means are provided for making chain or cable connections thereto whereby said mold-forms may be lifted and handled by means of derricks, or the like. Thus, to provide for making chain or cable connections to a mold-form when standing on end, U-bolts 24 are secured to the centers of the lateral edges of said mold-form. As shown, the ends of said U-bolts pass through holes formed in the inner flanges of the channel bars 6 and in plates 25 secured to the outer flanges of said channel bars, said U-bolts being secured in position by nuts threaded to the ends thereof, which bear against the inner flanges of said channel bars.

Again, to provide for making derrick connections to said mold-form when resting either upon its convex or concave sides, said mold-form is provided with connecting means as follows:—Secured to the outer ends of the mold-form are spaced plates 26 and 27 formed in which are holes 28, $28^1$, and 29, $29^1$, which form bearings for pins 30 provided with eyes 31 in their outer ends adapted for engagement by hooks secured to the ends of lifting chains 32 preferably secured to a spreader bar 34. As shown, said bearing plates are secured directly to angle bars 35 and 36 opposite ends of which are connected to longitudinal angle bars 37 and 38, of which the angle bars 37 are secured to the transverse channel bars 7 forming part of the mold-form and extend from end to end thereof, and the angles 38, to which the ends of said angle bars 35 and 36 remote from said end channel bars 7 are secured, are bent diagonally to bring their inner ends into contact with the intermediate channel bars 7, to which they are riveted or otherwise rigidly secured, thus forming rigid braces for said angle bars 35 and 36.

As shown, also, the outer bearing plates 35, which will sustain the greater part of the load, extend between and are riveted or otherwise rigidly secured to the webs of the double end channel bars 7.

In constructing the lining sections A, the reinforcing wires 1 and 2 are first secured to the mold-form in spaced relation to the skin-plate 10, preferably by means of rigid, but detachable connections, whereby, until disengaged therefrom, said wires will hold the lining sections A in position on said mold-form, which will thus form means for lifting and handling said lining sections. Obviously, therefore, to remove a lining section A from a mold-form B, it will first be necessary to detach said reinforcing wires.

As shown, the means for thus securing said reinforcing wires to the mold-form are as follows:—Mounted to turn in holes or bearings in the flanges of the channel bars 11 are screws 39 threaded to which are blocks 40, the outer sides of which are curved and formed on which adjacent to their upper ends are lips 41.

The reinforcing wires 1 are formed by strands of a single wire which is looped back and forth around the blocks 40, below the lips 41 thereon, which will thus prevent said loops from slipping off from said blocks. In applying the reinforcing wires 1 to said mold-form, the screws 39 are first turned to advance the blocks 40 towards the inner flanges of the channel bars 11. An end of the wire 1 is then anchored to a fixed support at the end of one edge of the mold form and is laced back and forth around the blocks 40, the relation being preferably such that the strands of said wire 1 will extend substantially parallel with each other. When the wire 1 has been looped around all of said blocks 40 the opposite end thereof is likewise anchored to a suitable support on said mold-form. The screws 39 are then turned to retract the blocks 40 which will operate, in an obvious manner, to draw the strands of said wire taut.

With the described construction, it is obvious that the loops of the longitudinal reinforcing wires 1 will project beyond the ends of the lining section A, which are defined by the adjacent surfaces of the inner flanges of the channel bars 11 and of the bars 12 associated therewith. The purpose of this feature of construction will be explained later.

The longitudinal reinforcing wires 1 having been secured in position, the transverse wires 2 are next applied. Said transverse reinforcing wires 2 are preferably made of such length that they will project a considerable distance beyond both lateral edges of the finished lining sections and the means shown for securing said transverse reinforcing wires in position consists of studs 42 secured in angles 43 riveted or otherwise rigidly secured to the outer sides of the outer flanges of the marginal channel bars 6, formed in which are slots 44 through which the ends of the transverse reinforcing wires 2 pass. Said transverse reinforcing wires are adapted to be secured to the studs 42 by clamping screws 45 having screw threaded engagement with holes formed in the heads of the studs 42. For convenience in forming the holes for said clamping screws, beveled surfaces 46 are formed on the heads of said studs substantially at right angles to said screw holes.

The studs 42 are arranged at intervals corresponding to desired spacing of the transverse reinforcing wires 2 and the dimension of said studs from the bottoms of the slots 44 to points in line with the surface of the skin-plate 10, is such that said transverse reinforcing wires 2 will extend closely adjacent to the longitudinal reinforcing wires 1.

Where the surface of the skin-plate 10 is curved, the transverse reinforcing wires 2 are supported in spaced relation to said skin plate by removable spacing bars 47 which extend substantially at right angles to said transverse reinforcing wires 2 and are supported in edgewise position on said skin-plate by blocks 48 provided with slots 49 adapted to receive said spacing bars 47, said slots being of such depth that the ends of said blocks in which said slots are formed, will rest in contact with the surface of the skin-plate 10.

In applying the transverse reinforcing wires 2 to the mold-form, an end of each of said wires is secured to the studs 42 at one side of the mold-form and are then passed over the mold-form, resting upon the spacing bars 47. Said wires are then drawn taut and their free ends secured to the studs 42 at the opposite side of said mold-form.

For convenience, the inner flanges of the channel bars 11 are of such height that the longitudinal reinforcing wires 1 will just clear the top edges thereof.

In setting up the mold, the bars 12 are not placed in position until after the reinforcing wires have been applied to the mold form and, are adapted to be held in position by any suitable means. Where, as assumed, the lining sections A are cast from concrete the outer side of the mold cavity is adapted to be closed by lagging 50, the ends of which rest upon the outer sides of the bars 12 and the end blocks 22. The lagging 50 preferably consists of angle bars of suitable size removably secured to the bars by suitable means, simple means for this purpose consisting of lag screws for securing the lagging to the end blocks 22 and clamps, such as are in common use by cabinet makers, carpenters, etc., for securing said lagging to the bars 12. A desirable size of angle bars for forming the lagging 50 is 4 x 4 x ¼. However, the size thereof is not material and may be varied within a considerable range.

Instead of angle bars, our invention contemplates the use of wood lagging, which may consist of 4 x 4 lumber secured in position in substantially the same manner as said angle bars.

Figure 1:
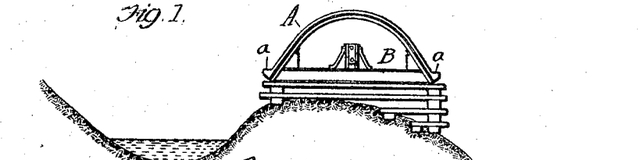
Figures 1 to 4 are diagrammatic views illustrating different steps in the process of lining water-courses in accordance with our invention.

In casting the lining sections A from concrete by means of the mold-form B, said mold-form is mounted in accessible position on a suitable support or foundation with its convex side upper-most, as shown in Fig. 1. The reinforcing wires 1 and 2 are then secured thereto, in the manner heretofore described, and the bars 3 for reinforcing the coping a mounted in position, which may be conveniently done by inserting the ends thereof through holes formed in the blocks 22 which close the ends of the sheet metal mold sections 19, and the concrete for forming the body portion of the lining section A, applied.

The actual casting or molding operation proceeds progressively from both lateral edges towards the center of the mold-form, the lagging 50 being applied to close, in succession, relatively narrow portions of the mold cavity which are filled with concrete as formed. At the extreme top or center of the mold-form it will be necessary to leave a space between the lagging applied to opposite sides of the mold-form through which concrete may be deposited into the mold cavity for forming this portion of the lining section A.

As the bars for spacing the transverse reinforcing wires 2 from the skin-plate 10 are reached, as the casting of the lining section progresses, they are removed in succession.

In order to render the inner surfaces of the lining sections smooth, thus reducing water friction, and also to close openings in the walls of the mold cavity, as the slots 15 and 18 in the skin-plate 10 and in the angle bars 17, respectively, said skin-plate and angle bars are covered with a layer of thin, flexible material, not shown, before the lining sections are cast. In practice, we have used tarred paper for this purpose with very satisfactory results.

In lining water-courses in accordance with our improved process, we preferably employ a considerable number of mold-forms, in usual practice, about 25. Said mold-forms are set up on a bank of the water-course and lining sections cast or molded thereon, in the manner heretofore described. When lining sections have been cast on said mold-forms and have set or hardened, the lagging 50, the sheet metal mold sections 19 and the end blocks 22, are removed, the screws 39 turned to advance the blocks 40 towards the inner flanges of the channel bars 11, and the looped ends of the reinforcing wires 1 disengaged from said blocks, and the bolts 13 disengaged from the skin-plate 10 of the mold-form, thus detaching the channel bars 11 from the mold-form, said channel bars being then removed, thus leaving the lining sections A secured to the mold-forms B only by the transverse reinforcing wires 2.

Said mold-forms, with the lining sections secured thereto are then turned over so as to bring the lining sections underneath, and said mold-forms with the lining sections secured thereto are then successively deposited in the water-course end to end and in such proximate relation that the projecting looped ends of the reinforcing wires 1 of adjacent lining sections will overlap each other. To permit said lining sections to be deposited in the relation specified, it will be necessary to detach and remove the mold-form carrying one lining section before a succeeding lining section is deposited.

In practice, said mold-forms with the lining sections secured thereto are deposited in the water-course one at a time, the first lining section being trued up, braced and back-filled, and the mold-form detached and removed therefrom before the next lining section is deposited, trued up, set and back-filled, and so on until all of said lining sections have been thus deposited.

With mold-forms constructed as described, it is obvious that the longitudinal edges of the mold-forms will project at both ends of the lining sections A and that when depositing a succeeding lining section into the water-course, in desired proximity to a preceding lining section, the longitudinal edge of the skin-plate 10 of the mold-form carrying said succeeding lining section will overlap the adjacent edge of the last lining section deposited into said water-course, thus providing very simple means for quickly and accurately aligning up succeeding lining sections with those previously deposited.

Figure 2:
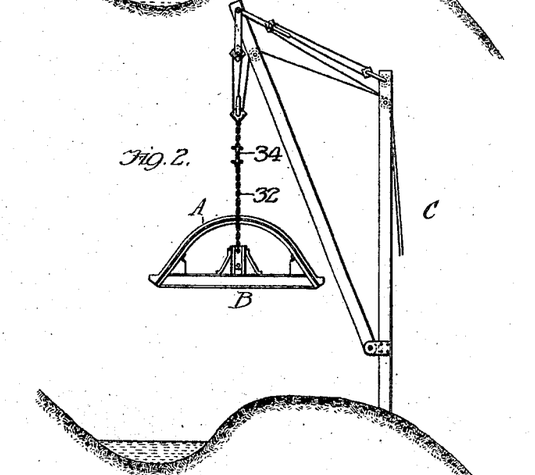
Figure 3:
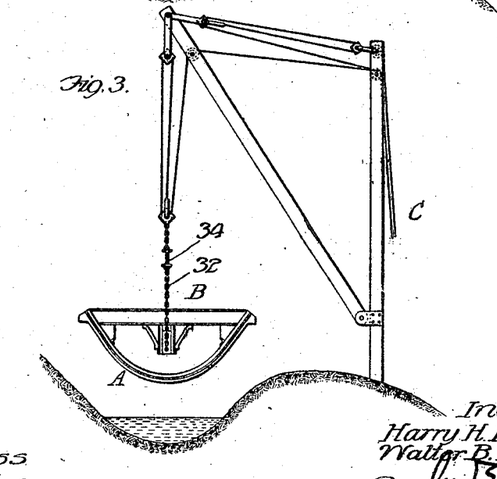
Figure 4:
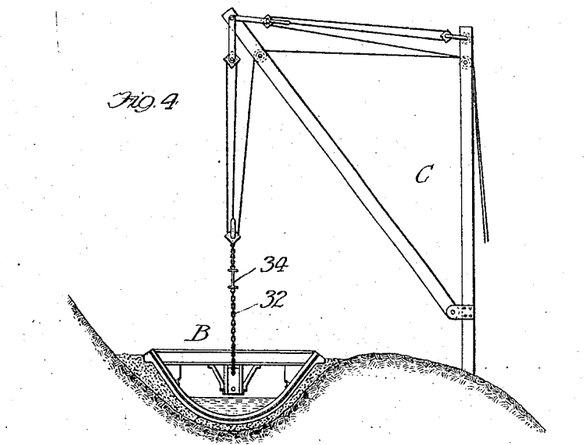
Figure 5:
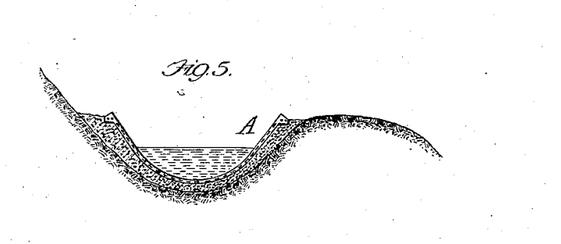
Figure 5 is a cross-sectional view of a water-course which has been lined in accordance with our improved process.
Figure 6:
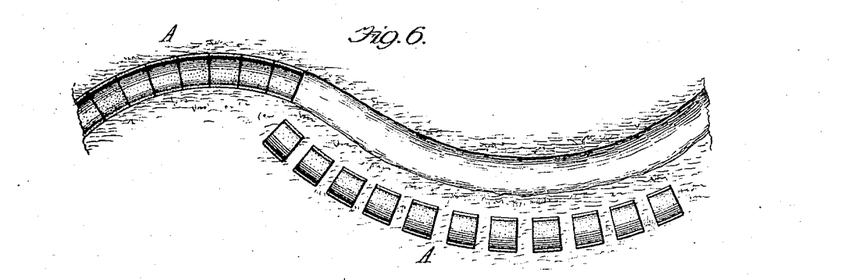
Figure 6 is a plan view of a section of a water-course in process of being lined.

In practice, said mold-forms and lining sections are adapted to be raised by means of a suitable derrick, indicated at C, Figs. 2 to 4, in the following manner:—The pins 30 are engaged with the holes 28, 28¹, formed in the plates 26 and 27, the axis of which passes through the approximate center of gravity of the mold-form when a lining section is secured thereto. The hooks on the hoisting chains or cables 32 are then engaged with the eyes 31 on said pins and said mold-form, carrying the lining section, raised above its support a sufficient distance to permit said mold-form and lining section to be turned up-side-down into the position shown in Fig. 3, with the lining section underneath. The boom of the derrick C is then swung to bring the lining section in proper position above the water-course and said mold-form and lining section lowered into the same with the longitudinal edge of the skin-plate overlapping the edge of the preceding lining section and the lining section secured to said mold-form in proper position relative to said preceding lining section. Said lining section is then trued up and back-filled to secure it permanently in position. The clamping screws 45, which anchor the transverse reinforcing wires 2 to the studs 42 are then loosened to disengage said transverse reinforcing wires from said studs, thus disengaging the lining sections A from the mold-form B, the pins 30 transferred to the holes 29, 29¹, the axis of which passes substantially through the center of gravity of said mold-form when it carries no lining section, and said mold-form raised out of the water-course, leaving the lining section in position therein.

Having set any desired number of lining sections in the water-course, the water is diverted or removed from the section of the water-course containing said lining sections, and the spaces between the ends of adjacent lining sections filled with grout or other suitable self-hardening material, in such manner that the overlapping looped ends of the longitudinal reinforcing wires will become embedded therein, thereby closing the openings between adjacent lining sections and also rigidly connecting all of said sections to form a substantially continuous, unitary lining for the water courses.

In addition to the convenience and expedition with which lining sections A may be handled and set by means of the carriers consisting of the mold-form B, a further particular advantage arising from handling said lining sections in this manner, is that said mold-forms will protect the lining sections so that they may be safely handled after they have set from eight to ten hours, whereas, if handled without the mold-forms or equivalent carriers, it would be necessary to permit said lining sections to set for approximately a week before they could be handled without great danger of breaking. Based on tests and practical demonstrations which we have made, the lining sections A handled in the manner described can be installed at the rate of approximately one an hour so that, with an equipment of approximately 25 mold-forms the work of constructing and setting the lining sections A can proceed progressively, one crew constructing the lining sections and another crew installing them. As the lining sections are installed and the mold-forms detached and removed, said mold-forms are transported to the lower end of the series of mold-forms on the bank of the water-course and erected in suitable position for the casting of another lining section, the work of transportation being performed by a third crew. Where the depth of the water will permit, boats may be used for thus transporting said mold-sections, the transportation and erection of each mold section occupying approximately the same length of time required for installing a lining section.

Where the normal depth in a water-course is not sufficient to permit the use of boats, a sufficient depth can usually be provided by means of a temporary dam which will raise the water level above said dam to provide a desired depth.

Also, if there are roads which will permit the use of trucks, transportation of said mold-forms to the lower end of the series may be effected by this means.

On the other hand, if the lining sections were handled independently of the mold-forms or other carriers, the number of mold-forms necessary for setting the lining sections as a continuous process would be several times that required when said lining sections are handled by means of the mold-form or other carriers, to thus handle said lining sections as a continuous operation without the use of the mold-forms probably requiring the use of approximately 150 mold-forms. As mold-forms suitable for the purpose will cost from five hundred (500) to one thousand (1,000) dollars each, depending on the sizes of the water-courses to be lined, and as in the practice of our improved process, we contemplate operating on several sections of the water-course simultaneously, the cost of constructing and handling said lining sections separately would be prohibitive.

As previously stated, instead of casting the lining sections A from concrete, our invention contemplates equally making said lining sections of other cement mixtures applied in accordance with usual practice.

Among others, we contemplate making said lining sections of a cement mixture known commercially as gunite and applying the same by what is known as the gunite process, which consists in projecting a jet of gunite mixture upon the surface of the mold-form by air pressure applied thereto.

In making the lining sections A of gunite, the mold-forms are made ready in the same manner as when said lining sections are to be cast from concrete, excepting that the lagging 50 is not employed, and said mold-forms are preferably set up and secured in position resting on one end. The gunite is preferably applied in layers, the first layer being of such thickness that it will just cover the reinforcing wires 1 and 2 and, after the first layer is partially set, a second layer being applied to bring said lining section to its full designed thickness.

In the construction of the lining sections A, and particularly when made of gunite, the reinforcing wires 1 and 2 operate not only to reinforce and strengthen said lining sections, but provide means for retaining the initial layer of gunite in position on the mold-form.

Also, when the lining sections are constructed with the mold-forms supported on end, the derrick connections for raising said mold-forms with the lining sections secured thereto, and for depositing them into the water-course, will be made to the U-bolts 24, said mold-forms being temporarily held from turning into horizontal position by suitable stay connections to their upper ends at the opposite sides of their centers of gravity from said U-bolts. Desirable stay connections for this purpose may consist of a usual block and tackle, not shown, which will also provide means for permitting said mold-form to turn slowly into horizontal position, when desired, without jarring or jolting, which might tend to injure the lining section secured thereto, if not thoroughly set.

Stated generally, the manner of making the lining sections A and the specific construction of the mold-forms B are both immaterial, our invention contemplating any desired or approved manner of producing said lining sections as casting, guniting or plastering and the use of mold-forms of any construction suitable for the purpose.

Neither do we desire to limit ourselves to the particular form of joint shown for connecting adjacent lining sections, as our invention contemplates the use of any desired or approved joint for this purpose.

Neither do we desire to limit ourselves to the particular reinforcement shown, as our invention contemplates the use of any desired form of reinforcement which conditions may call for—as standard or special reinforcing bars, mesh or fabric. In certain cases also—particularly in the lining sections for small ditches—reinforcing may be entirely dispensed with.

As previously stated, the transverse reinforcing wires 2 are made of such length that the ends thereof will project a considerable distance beyond the lateral edges of the lining sections. The object of this construction is to provide for extending the sides of the water-course, in case it is desired to increase its capacity.

Until such time as it is desired to thus extend the sides of the lining of the water-course, the projecting ends of said reinforcing wires 2 are bent down into the grooves or channels 21 in the copings $a$ of the lining, which are then preferably filled with suitable material which may be easily removed at small cost. A desirable material for this purpose is a lean cement mixture.

When it is desired to extend the sides of the lining of the water-course, see particularly Fig. 9, the material in the grooves 21 is removed, the ends of the reinforcing wires 2 extended and concrete extensions $A^1$ cast directly upon the copings $a$ of the original lining, by means of molds constructed in place, in a usual manner. Said extensions $A^1$ are reinforced by wires $1^1$ and $2^1$ corresponding to the longitudinal and transverse reinforcing wires of the lining sections A, the inner ends of the reinforcing wires $2^1$ overlapping the projecting ends of the reinforcing wires 2.

Our invention also contemplates forming copings $a^1$ at the edges of the lining extensions $A^1$, to provide for further extending the sides of the lining of the water-course, if desired. The copings $a^1$ will be reinforced by relatively large bars $3^1$ in the same manner as the copings $a$ are reinforced by the bars 3 and for the same purpose.

After the extensions $A^1$ have been formed and have been allowed to set, they are secured in position by means of back-filling in substantially the same manner as in the case of the lining sections A.

We claim:

1. The process of lining water-courses which consists in constructing the lining in trough-shaped sections on mold-forms, detachably connecting said lining sections to said mold-forms whereby said mold-forms will provide means for lifting and handling said lining sections, depositing said lining sections together with the mold-forms to which they are secured in the water-course, back-filling behind said lining sections when in position, detaching the lining sections from the mold-forms, and removing said mold-forms.

2. The process of lining water-courses as specified in claim 1, in which the lining sections are trued up with those previously set by depositing said lining sections and the mold forms to which they are secured, respectively, with an end of the mold form to which a lining section which is being set is secured, in engagement with the inner surface of the previously set adjacent lining section.

3. The process of lining water-courses as specified in claim 1, in which the act of securing the lining sections to the mold forms constitutes a step in the construction of said lining sections.

4. The process of lining water-courses which consists in detachably securing wires to mold-forms, applying lining material in plastic form to said mold-forms in manner to embed said wires therein, permitting said plastic lining material to harden, depositing said mold-forms together with the lining sections secured thereon into the water-course, back-filling behind said lining sections, detaching said wires from said mold-forms, and removing said mold-forms.

5. The process of lining water-courses which consists in detachably securing wires to mold-forms, applying lining material in plastic form to said mold-forms in manner to embed said wires therein with portions of said wires projecting at the ends of said lining sections, permitting the plastic material forming said lining sections to harden, depositing said mold-forms together with the lining sections thereon into the water-course in proximate, spaced relation with the projecting portions of the wires of adjacent lining sections extending into the spaces between them, closing said spaces with initially plastic material in manner to embed the projecting ends of said wires therein, back-filling behind said lining sections, detaching the wires from the mold-forms, and removing said mold-forms.

6. The process of lining water-courses which consists in detachably securing wires to mold-forms, applying lining material in plastic form to said mold-forms in manner to embed said wires therein with portions of said wires projecting at the ends of said lining sections, permitting the plastic material forming said lining sections to harden, depositing said mold-forms together with the lining sections thereon into the water-course in proximate, spaced relation with the projecting portions of the wires of adjacent lining sections extending into the spaces between them and overlapping, closing said spaces with initially plastic material in manner to embed the projecting, overlapping ends of the wires therein, back-filling behind said lining sections, detaching the wires from the mold-forms, and removing the mold-forms.

7. The process of lining water-courses which consists in detachably securing wires to mold-forms, applying lining material in plastic form to said mold-forms in manner to embed said wires therein with portions of said wires projecting at the ends of said lining sections in the form of loops, permitting the plastic material forming said lining sections to harden, depositing said mold-forms together with the lining sections thereon into the water-course in proximate, spaced relation with the projecting loop portions of the wires of adjacent lining sections extending into the spaces between them, closing said spaces with initially plastic material in manner to embed the projecting portions of said wires therein, back-filling behind said lining sections, detaching the wires from the mold-forms, and removing said mold-forms.

8. The process of lining water-courses which consists in detachably securing wires to mold-forms, said wires comprising wires which extend crosswise of said mold-forms, applying lining material in plastic form to said mold-forms in manner to embed said wires therein with the ends thereof projecting, permitting said plastic material to harden, depositing said lining sections together with the mold-forms to which they are secured, respectively, in the water-course, back-filling behind said lining sections, detaching said lining sections from said mold-forms, and removing said mold-forms.

9. The process of lining water-courses which consists in detachably securing wires to mold-forms, said wires comprising wires which extend lengthwise and others which extend crosswise of said mold-forms, applying lining material in plastic form to said mold-forms in manner to embed the reinforcing wires in said material with the attached ends therefrom projecting, permitting said plastic material to harden, detaching from said mold-forms wires the attached portions of which projecting at the ends of said lining sections, depositing said lining sections together with the mold-forms to which they are secured, respectively, into the water-course in proximate, spaced relation with the ends of the wires projecting at the ends of said lining sections extending into the spaces between adjacent lining sections, back-filling behind said lining sections, wholly detaching said lining sections from said mold-forms, removing said mold-forms and closing the spaces between said lining sections with plastic material in manner to embed the portions of the wires projecting at the ends of said lining sections therein.

10. A lining for a water-course, comprising separate trough-shaped sections set in said water-course end to end in proximate, spaced relation and means for connecting said sections to form a continuous, unitary structure consisting of wires embedded therein which project into the spaces between adjacent lining sections and lining material which fills said spaces and in which the projecting ends of said wires are embedded, said lining also comprising copings at the lateral edges of the lining sections provided at their ends with recessed shoulders, reinforcing bars embedded in said copings which extend lengthwise thereof and project into the spaces defined by the said recessed shoulders, and lining material which fills said spaces in which the projecting ends of the reinforcing bars are embedded.

11. A lining for a water course, comprising separate trough-shaped sections set in said water-course end to end in proximate, spaced relation and means for connecting said sections to form a continuous, unitary structure consisting of wires embedded therein which project into the spaces between adjacent lining sections and lining material which fills said spaces and in which the projecting ends of said wires are embedded, said lining also comprising wires embedded in the lining sections which project at the lateral edges thereof, and lateral extensions formed in situ in which the projecting ends of said wires are embedded.

12. A lining for a water-course, comprising separate trough-shaped sections set in said water-course end to end in proximate, spaced relation and means for connecting said sections to form a continuous, unitary structure consisting of wires embedded therein which project into the spaces between adjacent lining sections and lining material which fills said spaces and in which the projecting ends of said wires are embedded, said lining also comprising copings at the lateral edges of the lining sections provided at their ends with recessed shoulders, reinforcing bars embedded in said copings which extend lengthwise thereof and project into the spaces defined by said recessed shoulders and lining material which fills said spaces in which the projecting ends of said reinforcing bars are embedded, wires embedded in said lining sections which project at the lateral edges thereon as initially formed, said lining also comprising lateral extensions formed in situ in which the projecting ends of the wires embedded in the lining sections and which project at the lateral edges thereof are embedded, and which engage the copings of the lining sections with interlocking shoulders.

13. A lining for a water-course comprising separate trough-shaped sections set in said water-course end to end in proximate, spaced relation and means for connecting said sections to form a continuous, unitary structure consisting of wires embedded therein which project into the spaces between adjacent lining sections and lining material which fills said spaces and in which the projecting ends of said wires are embedded, said lining also comprising wires embedded in said lining sections which project at the lateral edges thereof, said lining sections as initially fabricated being provided with grooves in their lateral edges adapted to receive the bent-over projecting ends of said wires, said grooves being filled with a lean mixture of lining material in which the bent-over ends of said wires are embedded.

In testimony that we claim the foregoing as our invention, we have hereunto affixed our signatures the 23d day of May, 1922, and the 29th day of May, 1922, respectively.

HARRY H. FISHER.
WALTER B. RITTENHOUSE.